United States Patent
Lee et al.

(10) Patent No.: US 10,524,105 B2
(45) Date of Patent: Dec. 31, 2019

(54) METHOD AND APPARATUS FOR SENDING UPLINK DATA IN WIRELESS COMMUNICATION SYSTEM

(71) Applicant: LG ELECTRONICS INC., Seoul (KR)

(72) Inventors: Eunjong Lee, Seoul (KR); Heejeong Cho, Seoul (KR); Genebeck Hahn, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 15/545,671

(22) PCT Filed: May 27, 2015

(86) PCT No.: PCT/KR2015/005323
§ 371 (c)(1),
(2) Date: Jul. 21, 2017

(87) PCT Pub. No.: WO2016/117772
PCT Pub. Date: Jul. 28, 2016

(65) Prior Publication Data
US 2018/0020449 A1    Jan. 18, 2018

Related U.S. Application Data

(60) Provisional application No. 62/106,731, filed on Jan. 23, 2015.

(51) Int. Cl.
*H04W 72/14* (2009.01)
*H04W 4/90* (2018.01)
(Continued)

(52) U.S. Cl.
CPC ............. *H04W 4/90* (2018.02); *H04W 72/04* (2013.01); *H04W 72/0446* (2013.01); *H04W 72/14* (2013.01); *H04W 4/12* (2013.01)

(58) Field of Classification Search
CPC ......... H04W 4/12; H04W 4/90; H04W 72/04; H04W 72/0446; H04W 72/14
See application file for complete search history.

(56) References Cited

U.S. PATENT DOCUMENTS 8,483,151 B2 * 7/2013 Youn ................. H04W 72/10
370/329
2010/0118741 A1   5/2010 Youn et al.
(Continued)

FOREIGN PATENT DOCUMENTS

WO    2011109290    9/2011

OTHER PUBLICATIONS

PCT International Application No. PCT/KR2015/005323, Written Opinion of the International Search Authority dated Oct. 19, 2015, 10 pages.

*Primary Examiner* — Khaled M Kassim
*Assistant Examiner* — Zhaohui Yang
(74) *Attorney, Agent, or Firm* — Lee, Hong, Degerman, Kang & Waimey

(57) ABSTRACT

Disclosed herein is a method of transmitting UL data in a wireless communication system supporting low latency service. The method is performed by an eNB, and includes receiving an urgent signal providing notification of the generation of an event related to an emergency situation from a first UE, determining a point of time at which and/or a section in which an UL grant to be transmitted to a second UE is canceled, wherein the UL grant includes resource allocation information for transmitting, by the second UE, UL data, cancelling the UL grant to be transmitted to the second UE based on a result of the determination, and receiving an urgent message including the detailed information related to the generated event from the first UE.

15 Claims, 21 Drawing Sheets

(51) Int. Cl.
*H04W 72/04* (2009.01)
*H04W 4/12* (2009.01)

(56) References Cited

U.S. PATENT DOCUMENTS

| | | |
|---|---|---|
| 2010/0322144 A1 | 12/2010 | Lee et al. |
| 2011/0034145 A1* | 2/2011 | Youn ........................ H04W 4/90 |
| | | 455/404.1 |
| 2012/0082120 A1 | 4/2012 | Chun et al. |
| 2013/0163543 A1* | 6/2013 | Freda ................ H04W 72/0406 |
| | | 370/329 |
| 2013/0203372 A1* | 8/2013 | Sigle ........................ H04W 4/90 |
| | | 455/404.1 |
| 2013/0252573 A1 | 9/2013 | Dong et al. |

* cited by examiner

【Figure 1】
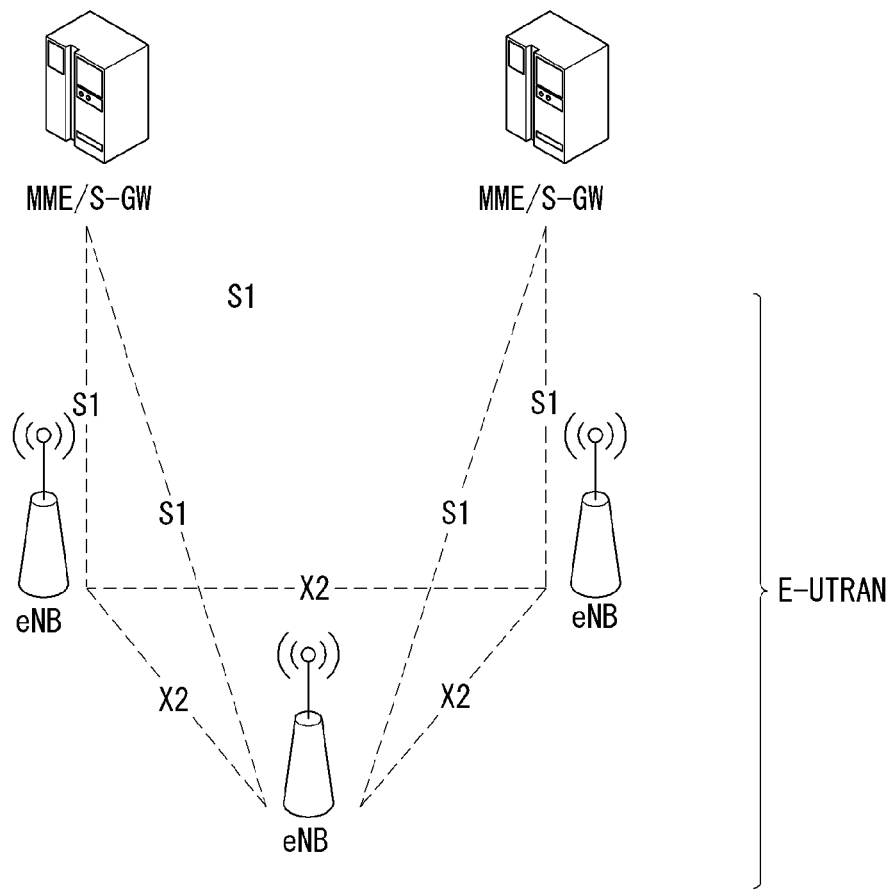

[Figure 2]
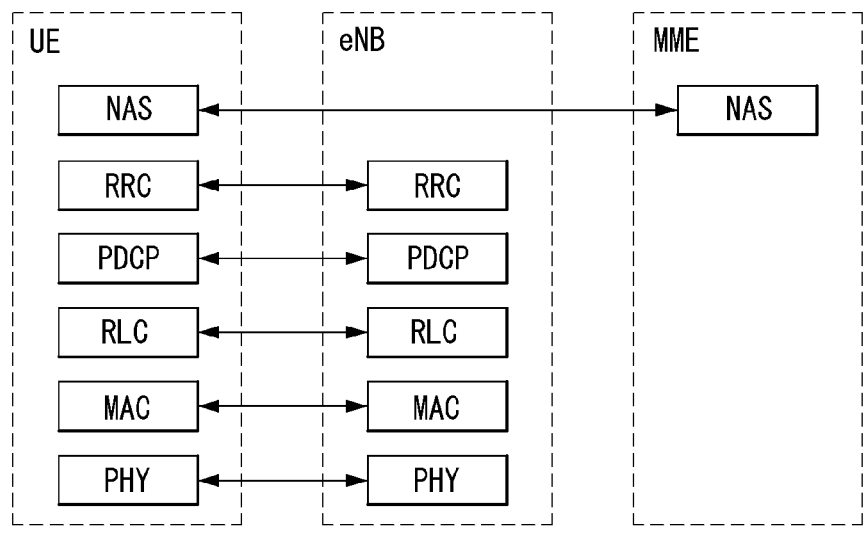
(a) Control plane protocol stack
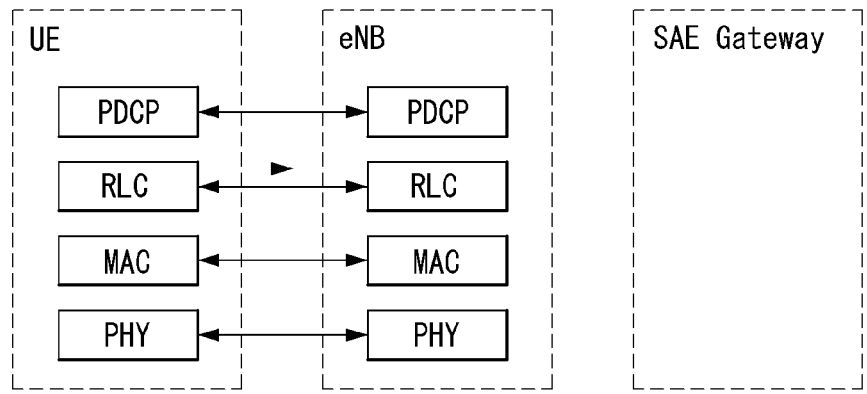
(b) User plane protocol stack

[Figure 3]
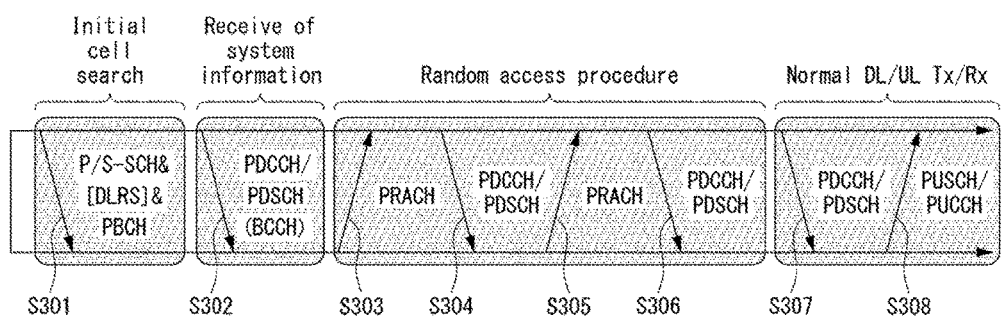

【Figure 4】
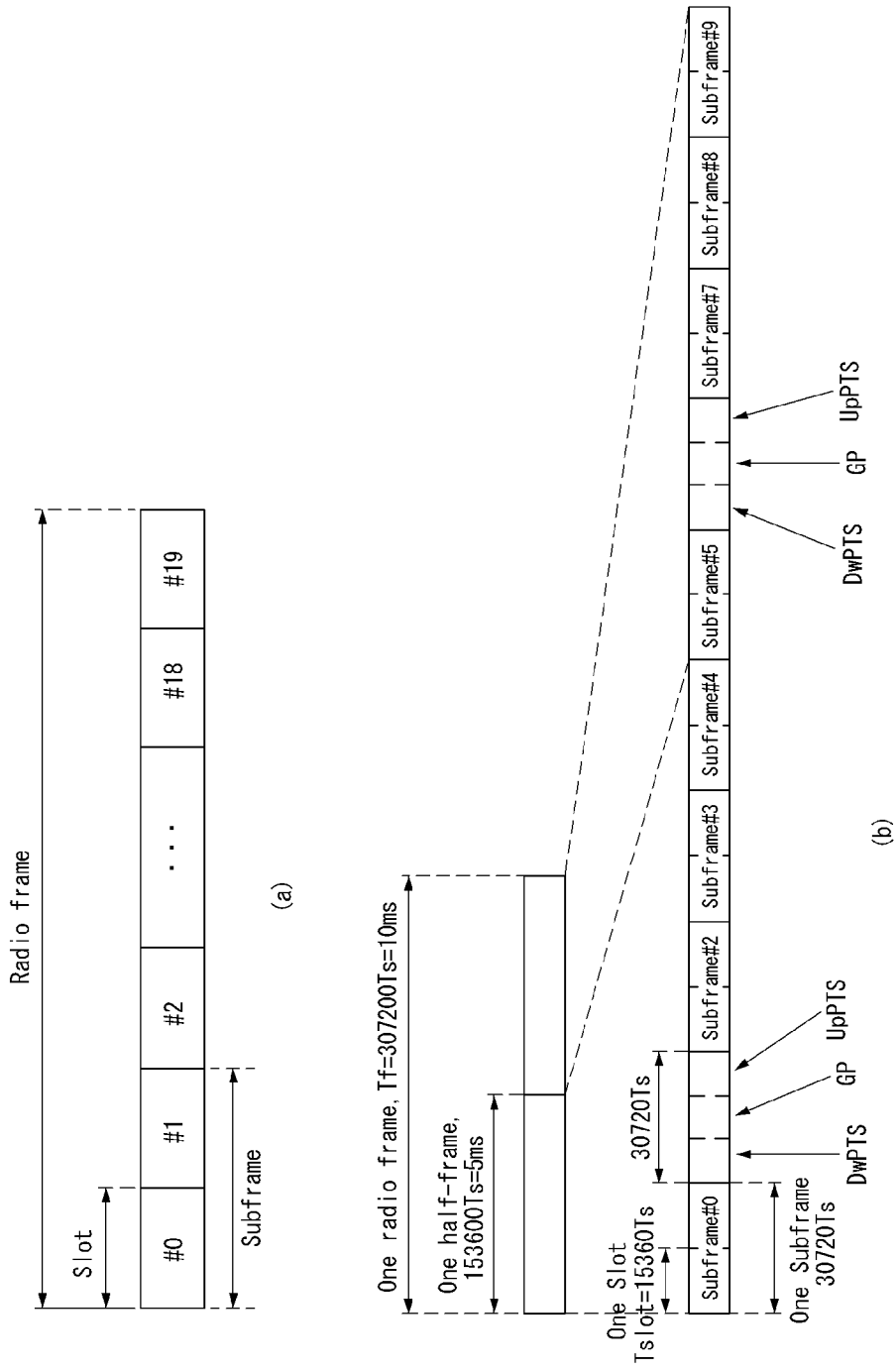

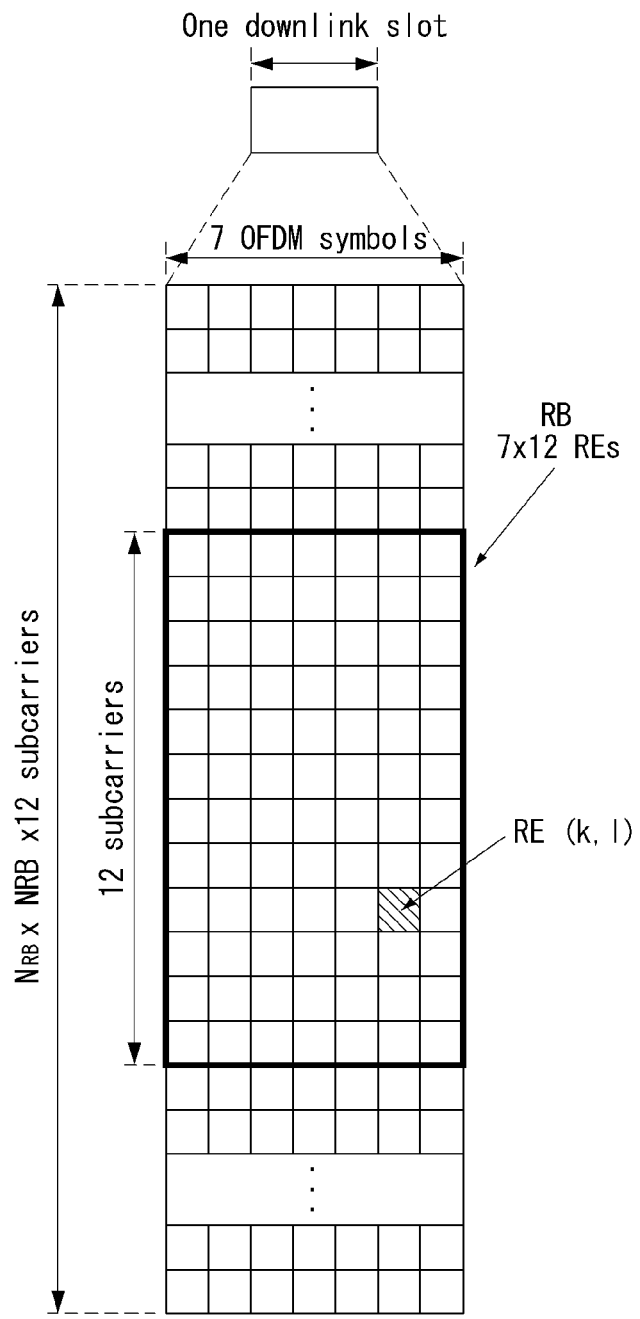
[Figure 5]

[Figure 6]
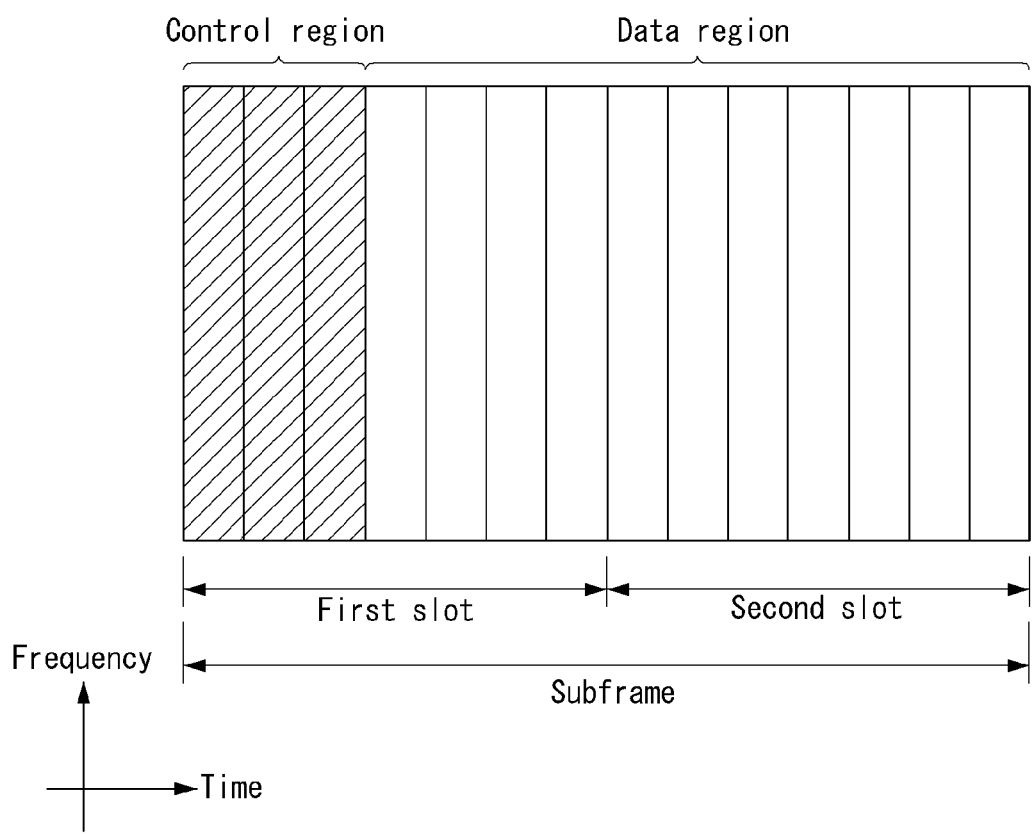

[Figure 7]
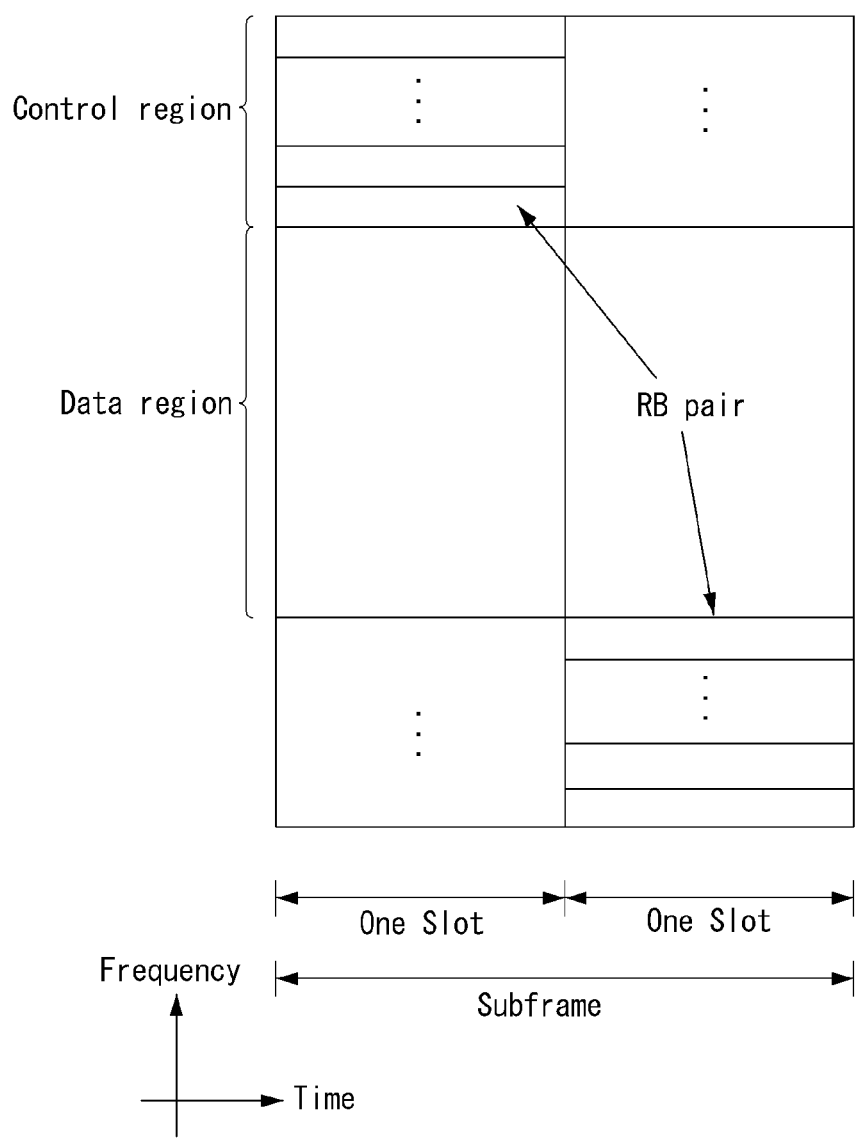

【Figure 8】
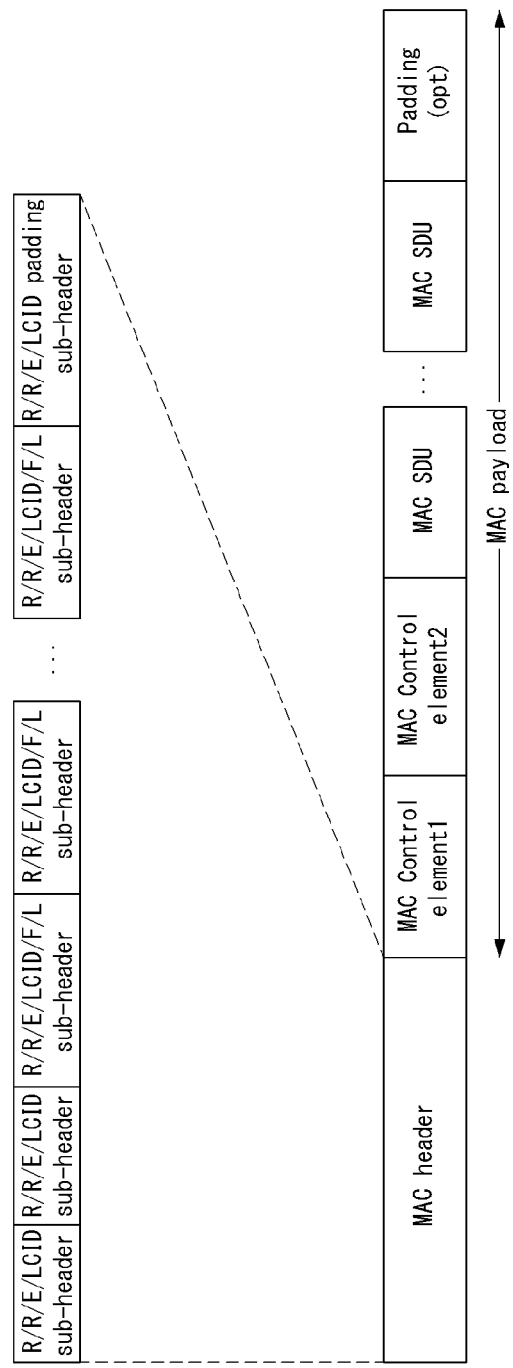

[Figure 9]
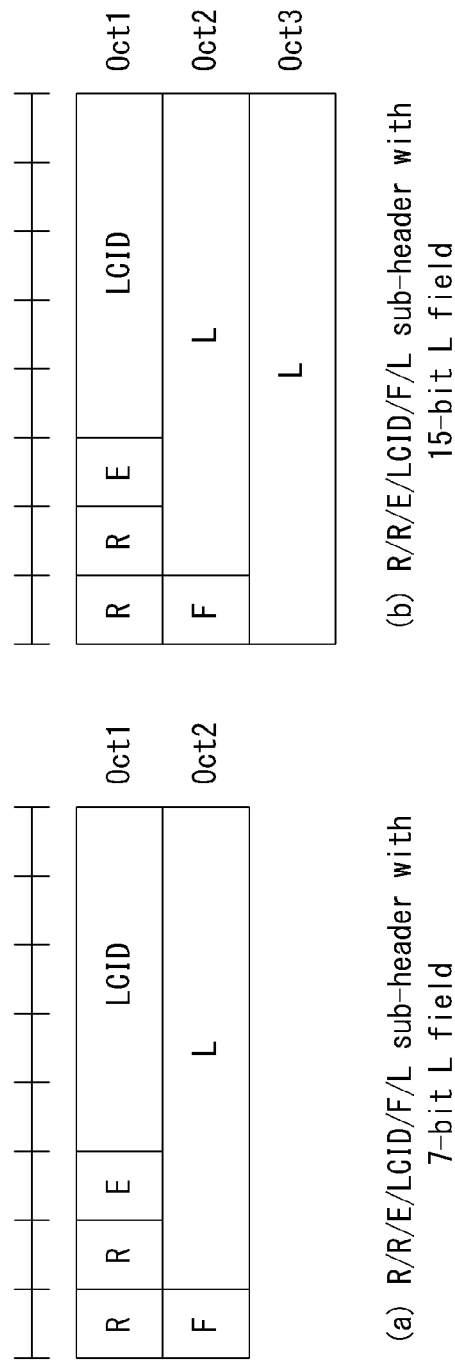
(b) R/R/E/LCID/F/L sub-header with 15-bit L field
(a) R/R/E/LCID/F/L sub-header with 7-bit L field

[Figure 10]
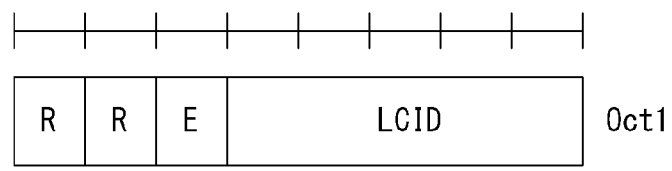
R/R/E/LCID sub-header

【Figure 11】
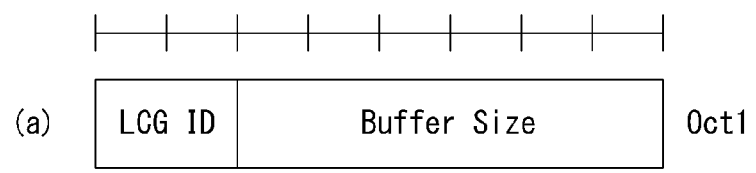
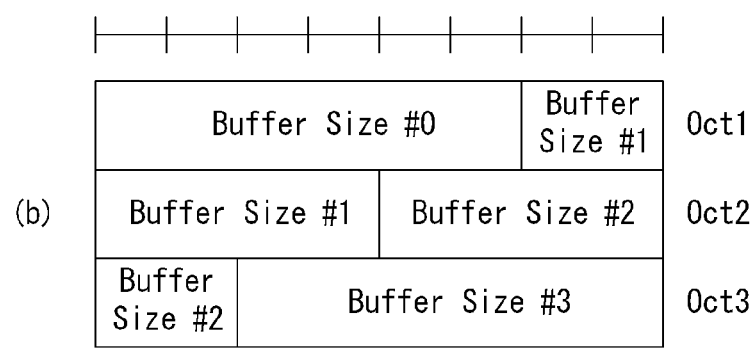

【Figure 12】
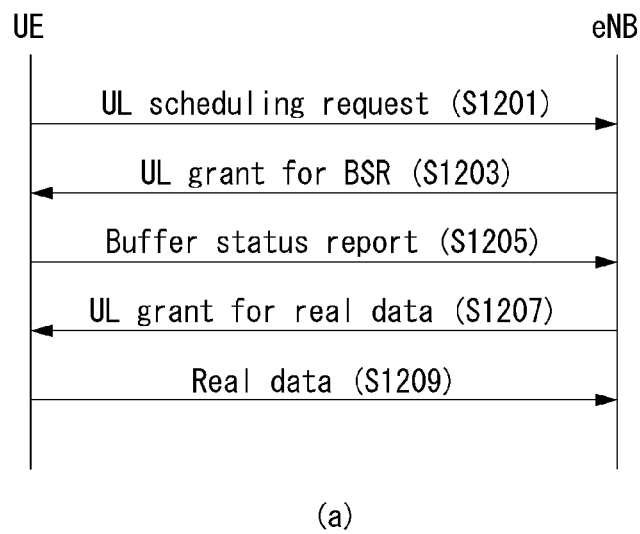
(a)
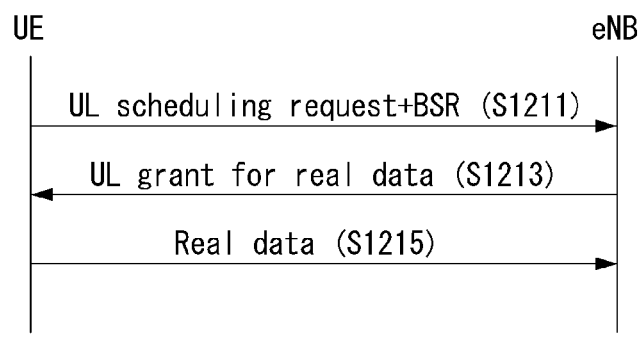
(b)

【Figure 13】
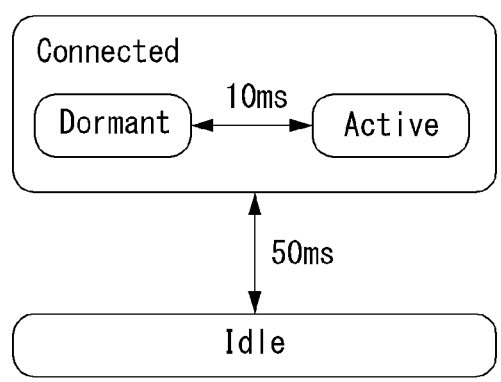

[Figure 14]
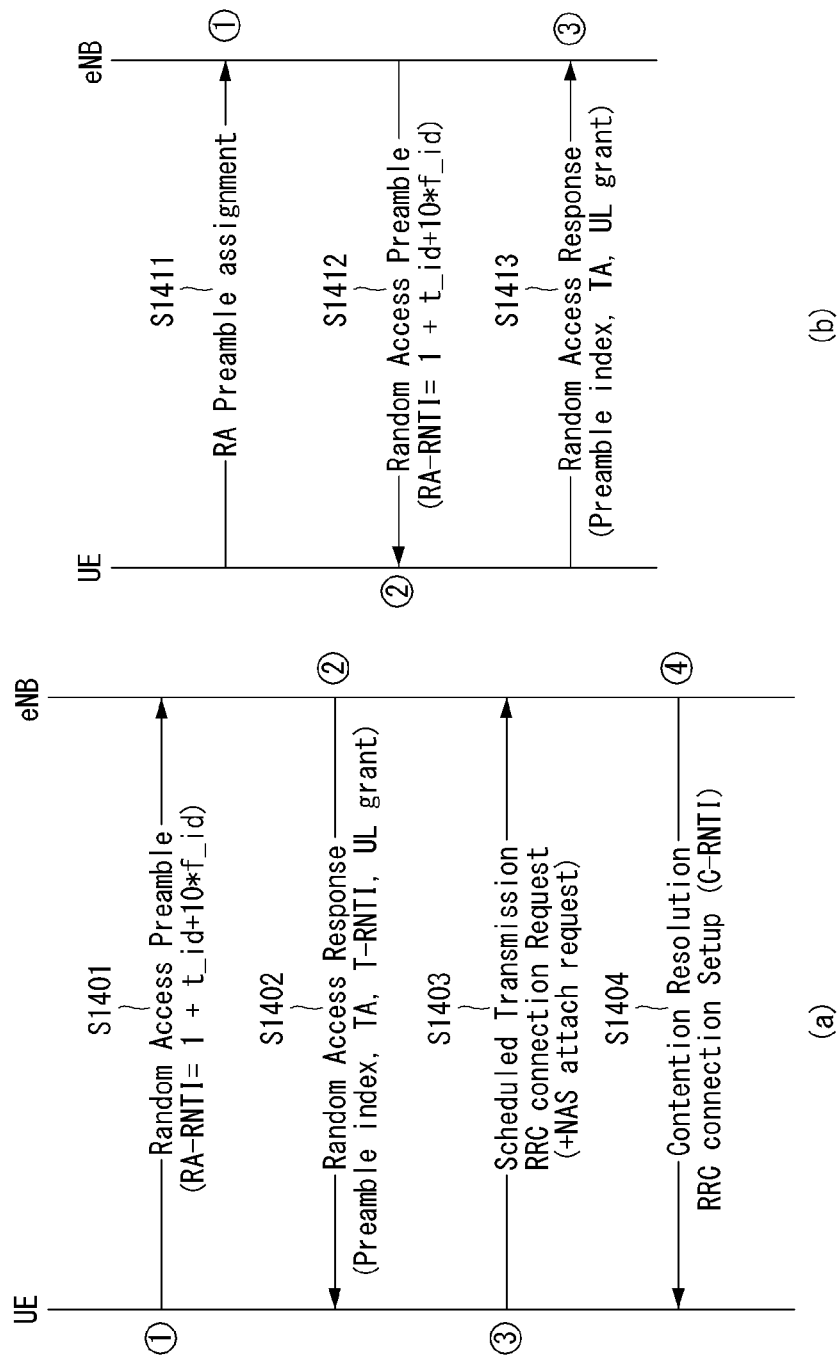

【Figure 15】
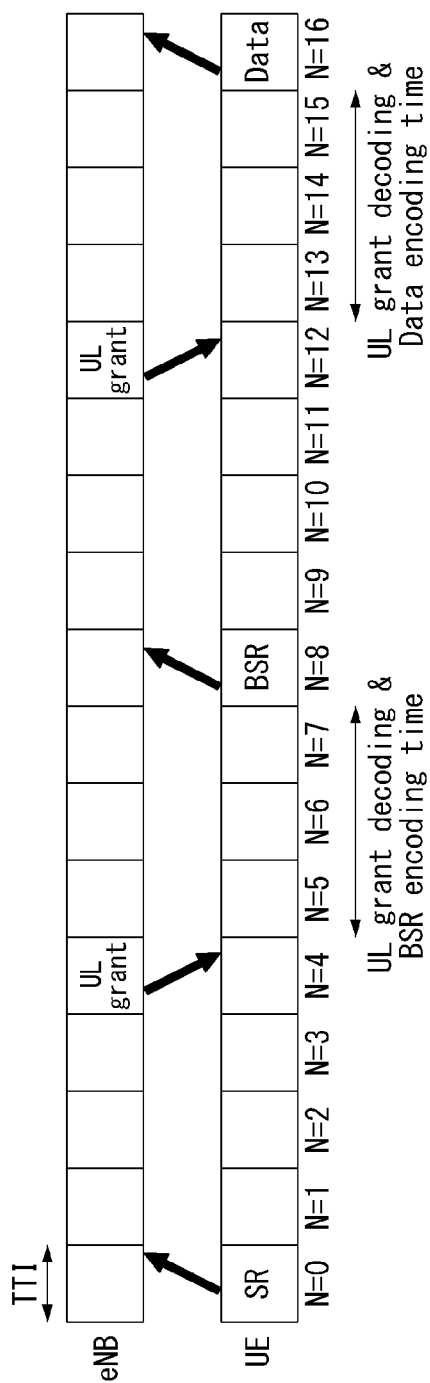

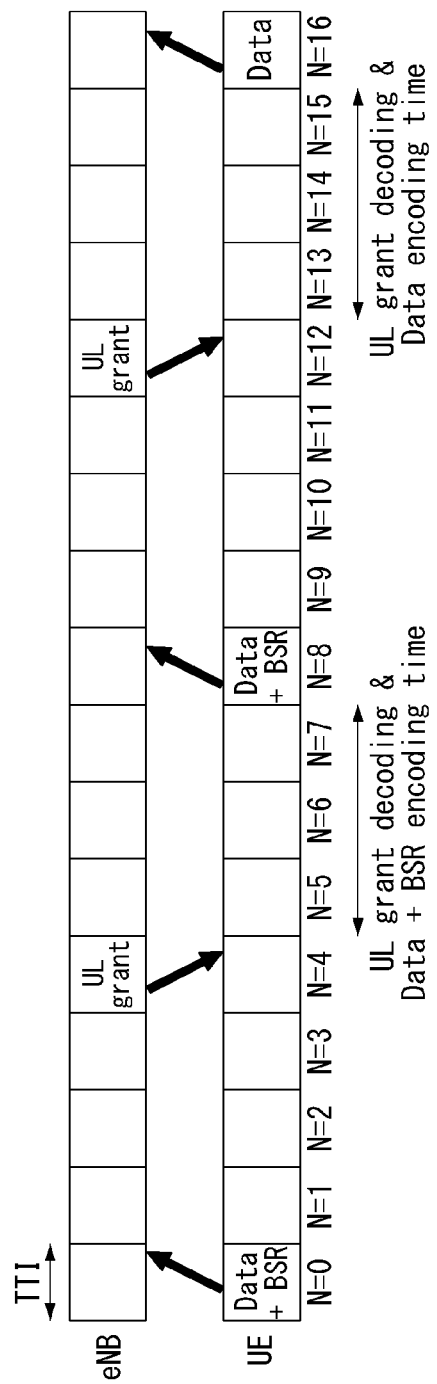
[Figure 16]

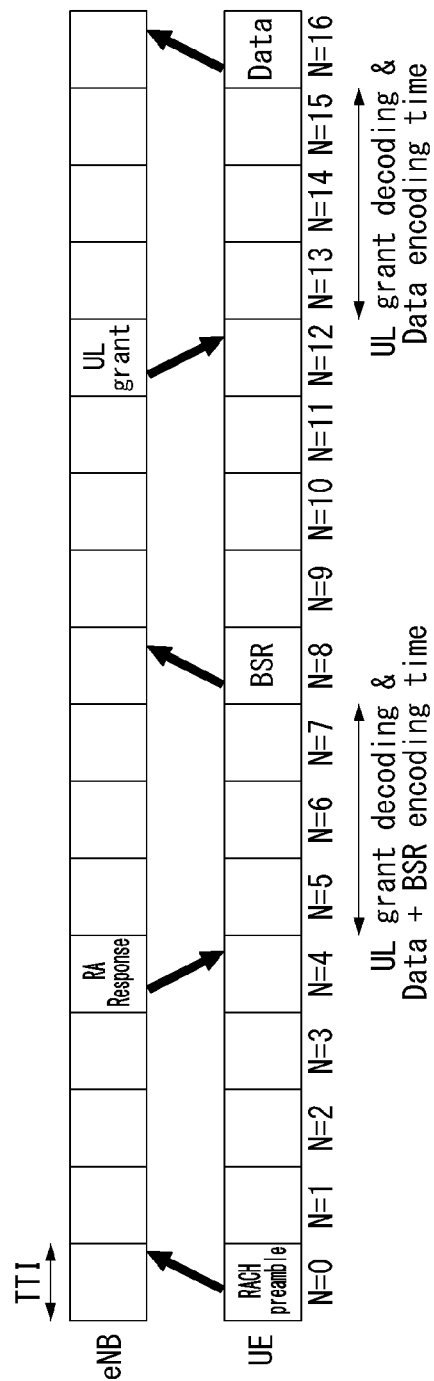

[Figure 18]
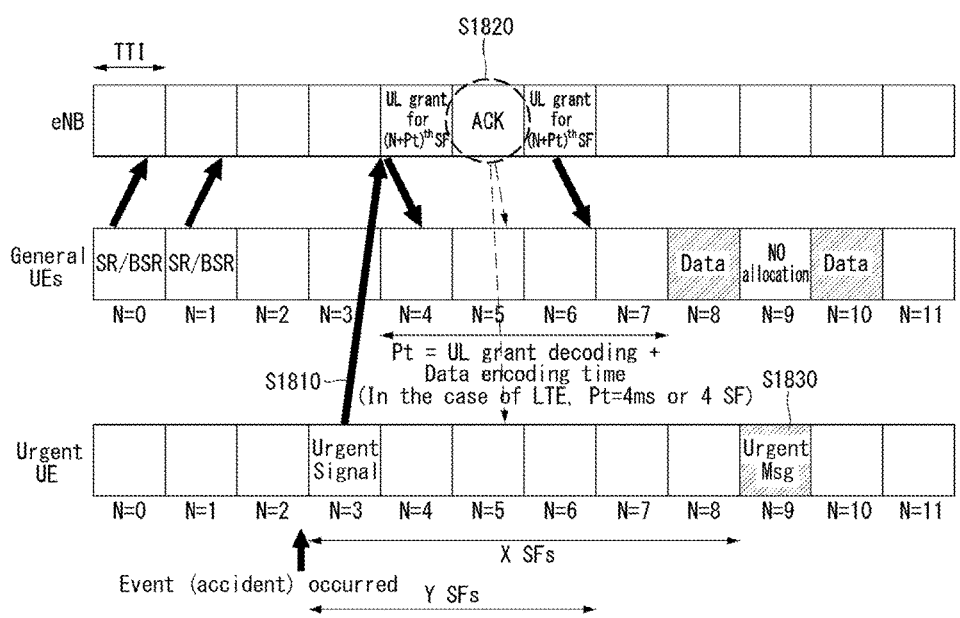

[Figure 19]
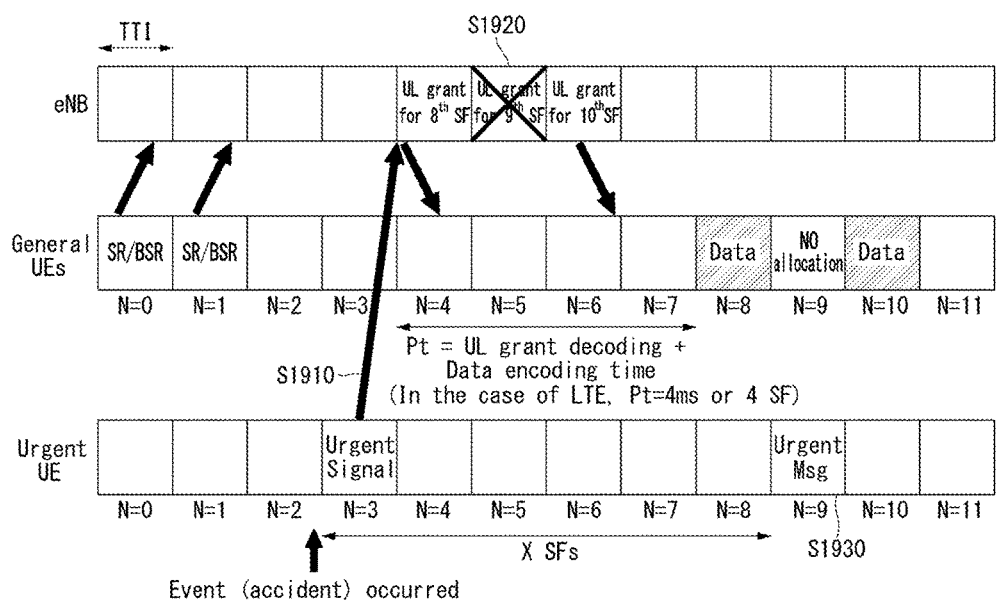

[Figure 20]
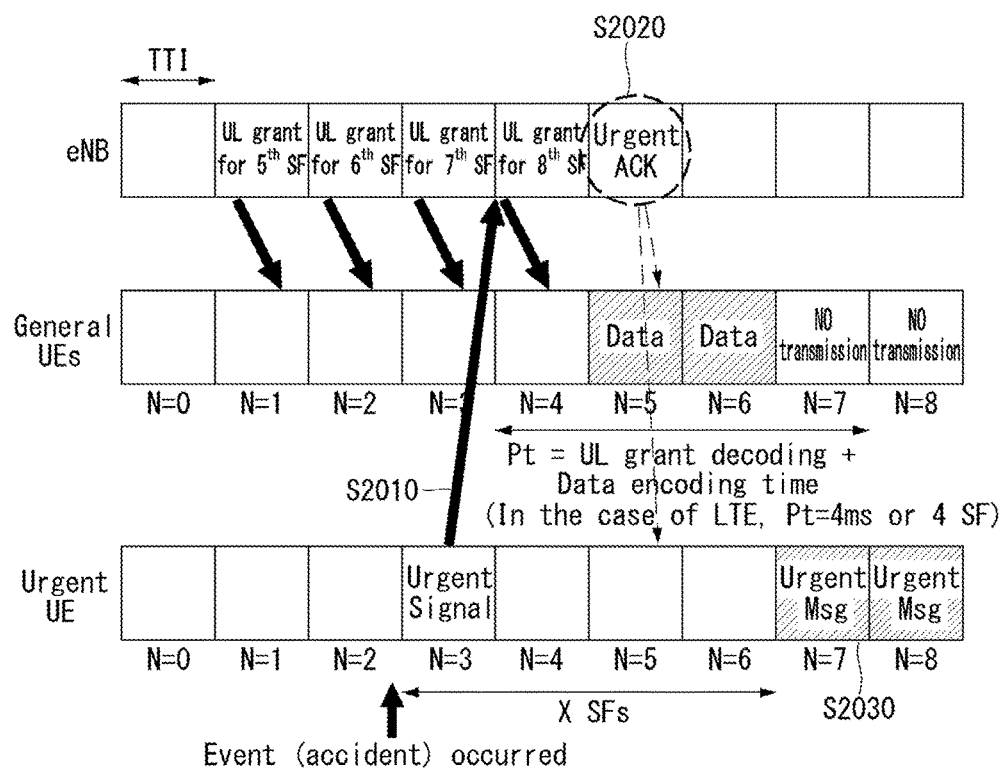

[Figure 21]
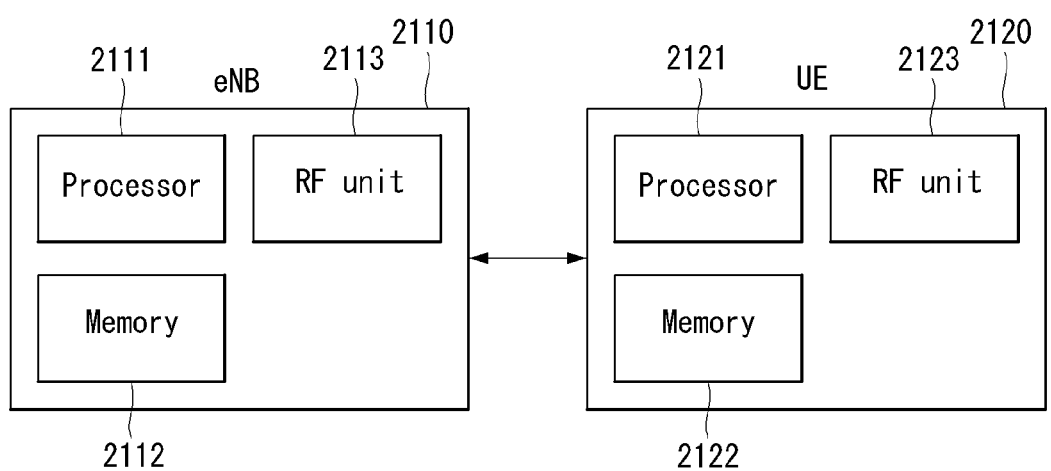

METHOD AND APPARATUS FOR SENDING UPLINK DATA IN WIRELESS COMMUNICATION SYSTEM

CROSS-REFERENCE TO RELATED APPLICATIONS

This application is the National Stage filing under 35 U.S.C. 371 of International Application No. PCT/KR2015/005323, filed on May 27, 2015, which claims the benefit of U.S. Provisional Application No. 62/106,731, filed on Jan. 23, 2015, the contents of which are all hereby incorporated by reference herein in their entirety.

TECHNICAL FIELD

The present invention relates to a wireless communication system and, more particularly, to a method of sending, by UE, uplink data to an eNB and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The present invention provides a method of more rapidly sending information or a message for an emergency situation by canceling or postponing the transmission of data having priority lower than an event related to an emergency situation when the event is generated.

Furthermore, the present invention provides a method of previously defining an urgent signal for each event or for each UE so that an eNB is aware that which event has been generated by only detecting the urgent signal.

Furthermore, the present invention provides a method of defining a point of time at which an urgent message including detailed information about an emergency situation is sent in order to improve efficiency of restricted uplink resources.

Technical objects to be achieved by the present invention are not limited to the aforementioned objects, and those skilled in the art to which the present invention pertains may evidently understand other technical objects from the following description.

Technical Solution

A method of sending uplink (UL) data in a wireless communication system supporting low latency service is performed by an eNB, and includes receiving an urgent signal providing notification of the generation of an event related to an emergency situation from a first user equipment (UE), determining a point of time at which and/or a section (or duration) in which an UL grant to be transmitted to a second UE is canceled, wherein the UL grant includes resource allocation information for sending, by the second UE, UL data, cancelling the UL grant to be transmitted to the second UE based on a result of the determination, and receiving an urgent message including the detailed information related to the generated event from the first UE.

Furthermore, in this specification, the urgent signal is received through a specific resource region or a specific sequence. The specific resource region or the specific sequence is previously mapped to each urgent event that is generated within a cell or each urgent UE within the cell.

Furthermore, in this specification, the method further includes sending information related to the specific resource region or the specific sequence to the first UE and/or the second UE using any one of broadcast, unicast, and multicast methods.

Furthermore, in this specification, the urgent signal is received using an ON/OFF keying method or through a physical urgent channel (PUCH).

Furthermore, in this specification, the method further includes sending an urgent ACK signal for notifying UEs within a cell of the generation of the event related to the emergency situation to the first UE and/or the second UE.

Furthermore, in this specification, the point of time at which the UL grant of the second UE is canceled is a subframe in which the urgent signal is received or a subframe right after the subframe in which the urgent signal is received.

Furthermore, in this specification, the point of time at which the UL grant of the second UE is canceled is one or more consecutive subframes (SFs).

Furthermore, in this specification, a point of time at which the urgent message is received is determined by taking into consideration at least one of the point of time at which the UL grant of the second UE is canceled and the processing time of the second UE.

Furthermore, in this specification, a method of sending UL data in a wireless communication system supporting low latency service is performed by a first UE, and includes sending an urgent signal providing notification of the generation of an event related to an emergency situation to an eNB and sending an urgent message including detailed information related to the generated event to the eNB, wherein a point of time at which the urgent message is sent is determined by taking into consideration at least one of a point of time at which an UL grant of a second UE is canceled and the processing time of the second UE, and the UL grant of the second UE includes resource allocation information that enable the second UE to send UL data.

Furthermore, in this specification, the processing time of the second UE is the sum of the decoding time of the UL grant received by the second UE from the eNB and the encoding time of the UL data.

Furthermore, in this specification, the method further includes receiving an urgent ACK signal including resource allocation information for sending the urgent message from the eNB.

Furthermore, in this specification, the urgent message is transmitted through one or more consecutive subframes (SFs).

Furthermore, in this specification, the urgent message is transmitted after a specific time since the urgent ACK signal is received.

Furthermore, in this specification, the urgent signal is transmitted through a specific resource region or a specific sequence, and the specific resource region or the specific sequence is previously mapped to each urgent event that is generated within a cell or each urgent UE within the cell.

Furthermore, in this specification, a method of sending UL data in a wireless communication system supporting low latency service is performed by a second user equipment (UE), and includes receiving a control message providing notification that an event related to an emergency situation has been generated from an eNB, wherein the control message includes information related to a cancel of an UL grant scheduled to be transmitted to the second UE, determining a section in which UL data is prohibited from being transmitted by taking into consideration at least one of the information related to the cancel of the received UL grant and the processing time of a system, and not sending the uplink data to the eNB in the section in which UL data is prohibited from being transmitted, wherein the information related to the cancel of the UL grant includes a point of time at which and/or a section in which the UL grant is canceled.

Furthermore, in this specification, the method further includes overhearing, by a first UE, an urgent signal for notifying the eNB of the generation of the event related to the emergency situation.

Furthermore, in this specification, the section in which UL data is prohibited from being transmitted is determined by taking into consideration the overheard urgent signal.

Advantageous Effects

In this specification, there is an advantage in that UE that has detected an urgent situation can rapidly notify an eNB of the urgent situation and preempt UL resources more rapidly compared to a prior art because an urgent signal is previously defined for each event or for each UE.

Such a rapid preemption of UL resources by an urgent UE enables an urgent message to be transmitted to an eNB more safely and without an error (i.e., an error-resistant message can be generated and transmitted because the entire single SF resource is secured). Accordingly, there is an advantage in that reliability in both latency and transmission can be guaranteed.

Accordingly, there is an advantage in that the transmission of the uplink data by UE with latency of 17.5 ms to 9 ms can be reduced to a maximum of 7 ms to 5 ms through the method proposed in this specification.

Furthermore, in this specification, there are advantages in that a safer and error-resistant message can be transmitted by solving a resource collision problem that may have been generated in a contention-based resource occupation method because contention-based resources are not used, but a resource occupation method based on control of an eNB is used.

Advantages that may be obtained in the present invention are not limited to the aforementioned advantages, and those skilled in the art to which the present invention pertains may evidently understand other advantages that have not been described from the following description.

DESCRIPTION OF DRAWINGS

The accompanying drawings included as part of the detailed description in order to help understanding of the present invention provide embodiments of the present invention and describe the technical characteristics of the present invention along with the detailed description.

FIG. 1 illustrates an example of the network configuration of an evolved universal terrestrial radio access network (E-UTRAN) to which an embodiment of the present invention may be applied.

FIG. 2 illustrates the structure of a radio interface protocol between a UE and an E-UTRAN in a wireless communication system to which an embodiment of the present invention may be applied.

FIG. 3 is a diagram illustrating physical channels used in a 3GPP LTE/LTE-A system to which an embodiment of the present invention may be applied and a known signal transmission method using the physical channels.

FIG. 4 illustrates the structure of a radio frame in 3GPP LTE/LTE-A to which an embodiment of the present invention may be applied.

FIG. 5 is a diagram illustrating a resource grid for a single DL slot in a wireless communication system to which an embodiment of the present invention may be applied.

FIG. 6 illustrates the structure of a DL subframe in a wireless communication system to which an embodiment of the present invention may be applied.

FIG. 7 illustrates the structure of an UL subframe in a wireless communication system to which an embodiment of the present invention may be applied.

FIG. 8 is a diagram illustrating an example of an MAC PDU used in an MAC entity in a wireless communication system to which an embodiment of the present invention may be applied.

FIGS. 9 and 10 illustrate the subheader of the MAC PDU in a wireless communication system to which an embodiment of the present invention may be applied.

FIG. 11 is a diagram illustrating an example of the format of an MAC control element for a buffer status report in a wireless communication system to which an embodiment of the present invention may be applied.

FIG. 12 is a diagram illustrating an example of a process of allocating UL resources to a UE in a wireless communication system to which an embodiment of the present invention may be applied.

FIG. 13 is a diagram illustrating latency in a control plane (C-plane) that is required in 3GPP LTE-A to which an embodiment of the present invention may be applied.

FIG. 14 is a diagram illustrating an example of a random access procedure to which an embodiment of the present invention may be applied.

FIGS. 15 and 16 are diagrams illustrating an example of a method of sending real data through a scheduling request and a BSR procedure.

FIG. 17 is a diagram illustrating an example of a method of sending real data through an RACH procedure.

FIG. 18 is a diagram illustrating an example of a method of sending UL data which is proposed in this specification.

FIG. 19 is a diagram illustrating an example of an operation method of an eNB for supporting the transmission of an urgent message which is proposed in this specification.

FIG. 20 is a diagram illustrating another example of an operation method of an eNB for supporting the transmission of an urgent message which is proposed in this specification.

FIG. 21 is a block diagram illustrating the configuration of a wireless communication apparatus to which the methods proposed in this specification may be applied.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal.

In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc.

The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention may be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel The MAC layer plays a role in mapping various logical channels to various transport channels. And, the MAC layer also plays a role as logical channel multiplexing in mapping several logical channels to one transport channel The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), preceding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path delay of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, 1) in the slot. Here, k (k=0, NRB×12−1) denotes an index of subcarrier in the frequency domain, and 1 (1=0, . . . , 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Buffer Status Reporting (BSR)

FIG. 8 illustrates the MAC PDU used in the MAC entity in the wireless communication system to which the present invention can be applied.

Referring to FIG. 8, the MAC PDU includes a MAC header, at least one MAC service data unit (SDU) and at least one control element, additionally may include a padding. In some cases, at least one of the MAC SDUs and the MAC control elements may not be included in the MAC PDU.

As an example of FIG. 8, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 8, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 8, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 8, the sub-header that is included four header fields may be used. In case that the sub-header includes four fields like this, the four fields may be R/R/E/LCID.

FIG. 9 and FIG. 10 illustrate the sub-header of the MAC PDU in the wireless communication system to which the present invention can be applied.

Each field is described as below with reference to FIG. 9 and FIG. 10.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCID: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 2 represents the value of LCID for the DL-SCH

TABLE 2

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 3 represents the value of LCID for the UL-SCH

TABLE 3

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 2 and Table 3 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 9(a)), otherwise, the 15-bit L field may be used (FIG. 9(b)). In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 10.

FIG. 11 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 11(a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 11(b), may include four buffer size fields indicating the buffer state of four groups having 0 to 3 LCG IDs. Each of the buffer size fields may be used for identifying the total amount of available data from different logical channel groups.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 12 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 12(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 12(a), the case that the PUSCH resource for transmitting the BSR is not allocated to a UE is illustrated, and the UE transmits the scheduling request (SR) to an eNB first in order to be allocated with the PUSCH resources (step, S1201).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S1203), the UE transmits the triggered BSR through the PUSCH resources which are allocated by the UL grant (step, S1205).

The eNB verifies the quality of data that the UE actually transmit to the UL through the BSR, and transmits the UL grant for the PUSCH resources for actual data transmission to the UE (step, S1207). The UE that receives the UL grant for actual data transmission transmits the actual UL data to the eNB through the PUSCH resources (step, S1209).

FIG. 12(b) exemplifies the UL resource allocation procedure for actual data in case that the UL radio resources for the BSR are allocated to a UE.

Referring to FIG. 12(b), the case that the PUSCH resources for BRS transmission are already allocated to a UE is illustrated. In the case, the UE transmits the BSR through the allocated PUSCH resources, and transmits a scheduling request to an eNB (step, S1211). Subsequently, the eNB verifies the quality of data to be transmitted to the UL by the UE through the BSR, and transmits the UL grant for the PUSCH resources for actual data transmission to the UE (step, S1213). The UE that receives the UL grant for actual data transmission transmits the actual UL data to the eNB through the allocated PUSCH resources (step, S1215).

FIG. 13 is a diagram for describing a latency in C-plane required in 3GPP LTE-A to which the present invention can be applied.

Referring to FIG. 13, 3GPP LTE-A requests a transition time from an idle mode (a state that IP address is allocated) to a connected mode to be less than 50 ms. In this time, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.

Uplink initiated transition, synchronized
Uplink initiated transition, unsynchronized
Downlink initiated transition, synchronized
Downlink initiated transition, unsynchronized
Random Access Channel (RACH) Procedure FIG. 14a and FIG. 14b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 14a illustrates one example of a contention-based random access procedure, and FIG. 14b illustrates one example of a non-contention based random access procedure.

First, the contention-based random access procedure will be described with reference to FIG. 14a.

The UE receives information about random access from the eNB through system information and stores the received information. Afterwards, in case random access is needed, the UE transmits a random access preamble (which is also called a message 1) to the eNB S1401.

If the eNB receives a random access preamble from the UE, the eNB transmits a random access response message (which is also called a message 2) to the UE S1402. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S1403. At this time, uplink transmission may be described as scheduled transmission.

After receiving the uplink transmission from the UE, the eNB transmits a message for contention resolution (which is also called a message 4) to the UE through a downlink shared channel (DL-SCH) S1404.

Next, a non-contention based random access procedure will be described with reference to FIG. 14b.

Before the UE transmits a random access preamble, the eNB allocates a non-contention random access preamble to the UE S1411.

The non-contention random access preamble can be allocated through a handover command or dedicated signaling such as signaling through the PDCCH. In case non-contention random access preamble is allocated to the UE, the UE transmits the allocated non-contention random access preamble to the eNB S1412.

Afterwards, similarly to the S1402 step of the contention-based random access procedure, the UE can transmit a random access response (which is also called a message 2) to the UE S1413.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

First, an UL data transmission method in an LTE(-A) system or 802.16m system is described in brief.

A cellular system, such as the LTE(-A) system or 802.16m system, uses an eNB scheduling-based resource allocation method.

In the case of a system using the eNB scheduling-based resource allocation method, if a UE has date (i.e., UL data) to be transmitted, the UE requests resources for sending the data from an eNB before sending the data to the eNB.

The request of resources by the UE from the eNB in order to send the data as described above is called a scheduling request.

Such a scheduling request of a UE may be performed by sending a scheduling request (SR) through a PUCCH or sending a buffer status report (BSR) through a PUSCH.

Furthermore, if an eNB has not allocated resources for sending an SR or BSR to a UE, the UE may request UL resources from the eNB through an RACH procedure.

The eNB that has received the scheduling request from the UE as described above allocates UL resources to be used by the UE to the UE through a DL control channel (i.e., an UL grant message, DCI in the case of LTE(-A)).

The DL control channel may be a PDCCH.

In this case, the UL grant transmitted to the UE through the PDCCH may become aware by explicitly signaling that resources allocated to the UE correspond to the resources of what subframe, but the time agreed between the UE and the eNB may be defined by allocating the resources of a subframe after a specific time (e.g., 4 ms in the case of LTE).

That is, if the eNB allocates resources to the UE after an X ms (e.g., 4 ms in the case of LTE(-A)), this means that both the time taken for the UE to receive and decode the UL grant and the time taken for the UE to prepare and encode uplink data to be transmitted are taken into consideration.

FIG. 15 is a diagram illustrating the time taken for a UE to send real data through a 5-step scheduling request procedure using PUCCH SR resources.

As illustrated in FIG. 15, the UE may send real uplink data after about 17 ms from the time when an SR signal is transmitted.

In this case, the SR resources allocated to the UE may be allocated to a PUCCH in a specific cycle and may be allocated in a cycle of a minimum of 1 ms~a maximum of 80 ms.

In this case, if an SR of a 1 ms cycle has been allocated to the UE, an average time taken for the UE to wait for PUCCH resources for sending the SR is 0.5 ms, and latency until data is transmitted to the eNB through a scheduling request is 17.5 ms.

If the UE has UL resources previously allocated by the eNB, the UE may send a resource request for newly generated data using the previously allocated resources.

Alternatively, the UE may request additional UL resources from the eNB by sensing the data transmitted through the previously allocated resources along with a BSR.

In this case, from FIG. 16, it may be seen that there is latency of 9 ms until the UE sends uplink data to the eNB after sending the BSR to the eNB.

If the UE does not have PUCCH SR resources or PUSCH resources allocated by the eNB or there is out of UL synchronization, the UE may request resources for newly generated data using an RACH procedure.

In this case, from FIG. 17, it may be seen that there is latency of 17 ms until the UE sends uplink data from a point of time at which the UE has send an RACH preamble to the eNB.

In this case, PRACH resources in which the RACH preamble may be transmitted may be set in each cell in a specific cycle.

Assuming that the PRACH resources have a cycle of a minimum of 1 ms, average data transmission latency of 17.5 ms may be generated.

As illustrated in FIGS. 15 to 17, there is latency of a minimum of 9 ms to a maximum of 17.5 ms until the UE sends uplink data.

In this case, there is an advantage in that efficiency of resources can be maximized because an eNB allocates resources optimal for the channel situation of each UE, but latency is generated if a UE sends UL data.

In 5 generation (5G) communication, requirements for supporting various real-time application services, such as healthcare, traffic safety, disaster safety, and remote medical control.

Accordingly, 5G communication aims to construct (target latency E2E or Radio 1 ms) an ultra-low latency system having an extremely short response time to the extent that a user may not be aware of awkwardness although tactile information that belongs to the five senses of a human being and that is most sensitive to latency is provided through the Internet.

In order to provide such 5G communication service, the latency of data transmission must be minimized However, current systems have been designed to additionally generate the following latency in data transmission.

DL Data Transmission Latency

Connected UE: 0 ms (no latency)

Dormant UE: Generation of latency of an average of 1 ms~1,280 ms depending on a DRX cycle set in a UE (a short DRX cycle: 2~640 ms, and a long DRX cycle: 10~2560 ms)

Idle UE: Generation of an average of 160 ms~1,280 ms+initial access latency depending on a DRX cycle set in a UE (a paging cycle: 320~2560 ms, and initial access: 50 ms~100 ms (LTE-A: 50 ms/LTE: 100 ms))

DL Data Latency

Synchronized & dormant UE: Generation of 17.5 ms latency (a 5-step SR)

Unsynchronized UE: Generation of 17.5 ms latency (an SR through an RACH)

Connected UE to which UL resources have been allocated: 9 ms (the transmission of data through the transmission of a BSR)

As described above, in order for UE send/receive data, various types of latency may be generated depending on the state of the UE. In particular, the latency of DL data reception may be generated in various lengths with respect to a dormant or idle state UE.

As one of schemes for reducing power consumption of a UE, the relation between data reception latency and power consumption needs to be carefully examined In data transmission latency in UL data transmission, it may be seen that additional latency is inevitably generated because the eNB scheduling-based data transmission method is used although UE may send data if necessary.

It is expected that an object of 5G communication is to provide major services for preventing secondary accidents or rapidly handling an emergency situation by notifying an eNB, surrounding UEs, or users of information about an accident or state that may be generated by a specific event on the time that cannot be predicted from various end users, such as a human being or machines (e.g., vehicles and sensors).

Such low latency services enable subsequent procedures to be performed by chiefly sending UL data rapidly.

For this reason, the rapid transmission of UL data, that is, the initiation stage of a corresponding service, is one of major factors that affect the latency of all the services.

For the reasons, in order to support low latency services of new 5G communication, latency in UL data transmission is considered to be a factor that must be reduced.

A method of sending UL data more rapidly in order to support low latency services in new 5G communication which are proposed in this specification are described in detail with reference to related drawings.

The UL data transmission method proposed in this specification may be basically performed through a 3-step method as follows.

1 step: a UE send an urgent signal
2 step: an eNB receives the urgent signal and sends an urgent acknowledgment signal to UEs
3 step: the UE sends an urgent message (or urgent data)

An overall procedure of the UL data transmission method through the 3-step method and steps thereof are described in detail with reference to FIGS. 18 to 20.

The 3-step UL data transmission method proposed in this specification has an object to rapidly send UL data related to an emergency situation, but it is not limited thereto and may be widely used in and applied to a method of rapidly sending data, such as short data.

FIG. 18 is a diagram illustrating an example of the UL data transmission method proposed in this specification.

First, a first UE sends an urgent signal to an eNB at step S1810.

The first UE is indicative of a UE capable of sending data related to a low latency service and may be represented as an urgent UE.

For convenience of description, the first UE and the urgent UE are interchangeably used.

The low latency service may refer to a server related to healthcare, traffic safety, disaster safety, and remote medical control that are now chiefly being discussed in 5G communication as described above.

A wireless communication system that supports such low latency services enables a specific UE to rapidly notify an eNB, surrounding UEs, and users of information about an accident or state that may be generated in a specific event so that people can prevent secondary accidents or rapidly handle an emergency situation.

The urgent signal means a signal through which the first UE notifies the eNB of an urgent situation after detecting the urgent situation.

The first UE may send the urgent signal to the eNB using (1) an ON/OFF keying method or (2) a new physical channel (e.g., a physical urgent channel (PUCH)).

A method of sending the urgent signal, that is, a detailed method of (1) and (2), will be described later.

When the urgent signal is received from the first UE, the eNB may send a response to the received urgent signal to the first UE and/or a second UE.

The response to the urgent signal may be represented as an urgent acknowledgement signal or an urgent ACK (signal).

In this case, the second UE may mean a general UE within a cell that does not send data for a low latency service.

Furthermore, the eNB may send the response to the urgent signal to the first UE and the second UE using a broadcast method.

Alternatively, the eNB may unicast the response to the urgent signal to only the first UE or the second UE.

More specifically, if the eNB receives the urgent signal from the first UE, it may support the transmission of an urgent message to the urgent UE by operating according to three types as follows at step S1820.

① The postponement or cancel of the transmission of an UL grant scheduled to be transmitted to the second UE ② The postponement or cancel of the transmission of an UL grant to the second UE (the method ①) and the transmission of the response to the urgent signal (or the urgent ACK signal) to the first UE and/or the second UE ③ The transmission of the response to the urgent signal to the first UE and/or the second UE After any one of the three type operations of the eNB, the first UE sends an urgent message to the eNB and/or surrounding UEs.

The urgent message may be represented as urgent data or an urgent PUSCH.

More specifically, the first UE sends the urgent signal in an Nth SF (SF #N) and sends the urgent message to the eNB and/or surrounding UEs in an SF (i.e., an SF #N+X) after X from the SF #N at step S1830.

The urgent signal is generated by a specific event, such as an emergency situation. The specific event may be generated in the SF #N in which the urgent signal is transmitted or in an SF prior to the SF #N.

The steps of the 3-step method of supporting the transmission of the urgent message by the UE are described in more detail below.

Method of Sending Urgent Signal

First, the first step (i.e., step S1810 of FIG. 18), that is, a method of sending, by the first UE, the urgent signal is described.

When the generation of a specific event, such as an emergency situation, is detected, the first UE (or the urgent UE) firs sends the urgent signal to the eNB in order to send urgent information or an urgent message related to the generated specific event.

The urgent signal may be used to immediately notify the eNB of the generation of a specific event related to an emergency situation and also to previously secure resources for sending the urgent message including detailed information about the generated specific event.

Accordingly, the urgent signal may mean a signal transmitted from the urgent UE to the eNB in order to receive the allocation of resources for sending the urgent information or urgent message, that is, an UL grant, from the eNB.

The urgent signal may be transmitted using (1) an ON/OFF keying method or (2) a new physical channel (physical urgent channel (PUCH)).

In this case, the urgent signal may be represented as an urgent sequence.

Furthermore, the resources for sending the urgent signal may be previously configured in each event or each UE.

A method of configuring resources for sending an urgent signal for each event and sending the urgent signal using the ON/OFF keying method or a new physical channel (physical urgent channel (PUCH)) and a method of configuring resources for sending an urgent signal for each UE and sending the urgent signal using the ON/OFF keying method or a new physical channel (physical urgent channel (PUCH)) are separately described below.

Method of Configuring Resources for Sending Urgent Signal for Each Event and Sending Urgent Signal First, the method of configuring resources for sending an urgent signal for each event is described.

An urgent event that may be generated in order to send an urgent signal is previously defined. In this case, the urgent event may be indicated by "En."

In this case, n is an integer value greater than 0.

An eNB may previously allocate specific resources (e.g., PUCCH resources) or a specific sequence (e.g., a PUCH sequence) corresponding to the number of urgent events (n) that may be previously defined so that an urgent UE sends the urgent signal.

In this case, information about specific resources (i.e., a PUCCH US or PUCH) for sending the urgent signal may be differently defined in each cell.

The specific resources or the specific sequence may be indicated by resource allocation information for sending the urgent signal.

The resource allocation information for sending the urgent signal may be transmitted to UEs within a cell through a broadcast message or a radio resource control (RRC) message, such as system information (e.g., SIB2).

Alternatively, if the resource allocation information for sending the urgent signal is to be transmitted to only a urgent UE capable of sending a specific urgent signal (depending on a system definition), the eNB may send the resource allocation information for sending the urgent signal to only corresponding urgent UEs using a unicast or multicast method.

In this case, events that may be generated or used for the transmission of the urgent signal may be list as in an example of Table 4 below and may be defined as a total of n events "event 0~event (n−1)."

Furthermore, the events may be previously defined within a cell as in Table 4 below and may be differently defined in each cell.

Furthermore, information related to the event may be transmitted along with a message for sending detailed information about the urgent signal and may be previously defined depending on the system.

TABLE 4

| Event | Description |
| --- | --- |
| 0 | Collision between vehicles |
| 1 | Slide of road surface |
| 2 | Overturn of vehicle |
| 3 | Car fire |
| 4 | Heart attack |
| 5 | Danger of blood pressure |
| 6 | Excessive bleeding |
| ... | |
| n − 1 | Others |

That is, specific resources or a specific sequence for sending an urgent signal may be previously mapped to each of the events defined as in Table 4.

A method of sending an urgent signal using the ON/OFF keying method based on resources for sending the urgent signal which have been configured for each event is described.

If an urgent signal is to be transmitted using the ON/OFF keying method, an eNB allocates PUCCH resources, corresponding to the number of corresponding events (n), to a specific transmission time interval (TTI) or a specific SF based on urgent events defined within a cell.

An RRC information element including resource information related to the transmission of the urgent signal may be defined as follows.

If the urgent signal is to be transmitted using the physical layer structure of LTE(-A), the PUCCH format 1 may be reused to send the urgent signal.

In this case, an urgent signal (US) may be used instead of the scheduling request (SR) of a PUCCH.

That is, the following items may be defined in the RRC information element, and the RRC information element may include US resource allocation information, US configuration information, and US signaling information.

If only an urgent signal (US) is to be transmitted, the US is transmitted using the PUCCH format 1

US Resource Allocation Information

If US resources for each of events defined in a cell are configured as an unicast message, the resources of the US may be set up or released through an RRC Connection Reconfig. (Radio Resource Config. Dedicated (Physical config. Dedicated (US config))) message.

Alternatively, if the resources of an US for each of events defined in a cell is configured as a broadcast message, the resources of the US may be set up or released through a System Information Block Type2 (Radio Resource Config Common (US config.)).

Furthermore, if an US is to be transmitted using the LTE(-A) physical layer structure, US resources for a maximum of 2,048 events ((0, . . . , 2047)) may be allocated to a single SF.

Alternatively, if an US is to be transmitted using a short TTI having a smaller length than the TTI (14 symbols) of an LTE(-A) system, the number of events that may be allocated to a single (i.e., short) SF may be smaller than 2,048 depending on allocated resources.

US Configuration Information

US periodicity may be set depending on an US configuration index, and an US SF offset may also be set depending on an index.

US Signaling

An urgent UE may send an US to an eNB using the simple ON/OFF keying (O.O.K) method.

D(0)=1: Preempt a PUSCH resource of (N+X)th sub-frame (i.e., a positive US)

D(0) means data, D(0)=1 (i.e., a positive value) means that there is the transmission of specific data, and D(0)=0 (i.e., a negative value) means that there is no transmission of specific data.

That is, D(0)=1 means that there is an US to be transmitted and indicates that the PUSCH resources of an (N+X)th SF (SF #N+X) are previously allocated so that an urgent message can be transmitted.

In this case, N indicates the number of SFs in which the US is transmitted.

Transmitting nothing indicates that there is no transmission of an urgent signal (a negative US).

The transmitting nothing may be represented as D(0)=0.

The following illustrates an example of an UrgentSignal-Config information element.

UrgentSignalConfig information element

```
-- ASN1START
UrgentSignalConfig ::=     CHOICE {
    release                         NULL,
    setup                           SEQUENCE {
        us-evnet0-PUCCH-ResourceIndex      INTEGER (0..2047),
        us-evnet0-ConfigIndex              INTEGER (0..157),
        us-evnet1-PUCCH-ResourceIndex      INTEGER (0..2047),
        us-evnet1-ConfigIndex              INTEGER (0..157),
        ...
        us-evnet(n-1)-PUCCH-ResourceIndex      INTEGER (0..2047),
        us-evnet(n-1)-ConfigIndex              INTEGER (0..157),
    }
}
-- ASN1STOP
```

Accordingly, an urgent event having a mapping relation set up with each of US resources is generated, an urgent UE carries power on the US resources mapped to the generated urgent event and sends an US to an eNB in order to notify the eNB of the generated urgent event.

That is, the eNB can rapidly check that what type of an urgent event has been generated by receiving the urgent signal in specific resources.

A method of sending an urgent signal through a new physical channel (e.g., a physical urgent channel (PUCH)) based on resources for sending an US set in each event is described.

In this case, the urgent signal may also be represented as an urgent sequence.

Such a method means that a physical urgent channel (PUCH) that belongs to PUSCH resources and that is used to send an urgent sequence is newly defined.

That is, if a specific event, such as an emergency situation, is generated, an urgent UE sends an urgent sequence to an eNB through a PUCH mapped to the generated specific event.

In this case, the eNB can rapidly check that what event has been generated by mapping event information defined in a system or cell to a specific urgent sequence or the PUCH when it receives the specific urgent sequence from the urgent UE.

In this case, the urgent sequence may mean an urgent signal or may mean a PUCH in which the urgent signal is transmitted.

The physical urgent channel (PUCH) may be defined using a similar method as that of a physical random access channel (PRACH).

First, the PRACH occupies 6 resource blocks (RBs)) in the LTE(-A) system resource structure and has a subcarrier interval of 1.25 kHz (the format #4 has a subcarrier interval of 7.5 kHz).

Furthermore, the PRACH may have 64 preamble sequences in each cell.

Each preamble sequence part includes a ZC sequence of a length 839 (the format #4 has a length of 139).

More specifically, the urgent sequence is defined to have a smaller number of sequences than the number of preamble sequences (64) defined in the PRACH. In this case, a specific urgent event may be mapped to each urgent sequence.

Alternatively, a specific range (0~63) of the PRACH preamble may be previously allocated as an urgent sequence for sending an urgent signal.

Method of Configuring Resources for Sending US for Each UE and Sending Urgent Signal A method of configuring resources for sending an urgent signal for each UE and sending the urgent signal through the configured resources is described in detail below.

If resources for sending an urgent signal are allocated to each UE, an eNB can immediately recognize a specific UE (i.e., an urgent UE) by receiving the urgent signal. Accordingly, the eNB can rapidly allocate an UL grant (i.e., UL resources) to the specific UE.

As described above, a method of sending, by an urgent UE, an urgent signal may include (1) sending the urgent signal using the ON/OFF keying method or (2) sending an urgent sequence through a new physical channel (e.g., a physical urgent channel (PUCH)).

A method of sending, by an urgent UE, an urgent signal using the ON/OFF keying method based on resources for sending an US configured for each UE is described below.

An eNB may previously allocate PUCCH resources, corresponding to the number of urgent UEs, to a specific TTI (or specific SF) depending on urgent UEs connected thereto within a cell so that an urgent UE can send an urgent signal using the ON/OFF keying method.

The eNB may include resource information related to the transmission of the urgent signal in an RRC information element and send the RRC information element to the urgent UE and/or general UEs, that is, UEs within the cell.

The RRC information element may be defined as follows.

In this case, the urgent signal may be transmitted using the physical layer structure of an LTE(-A) system. In this case, the US may be transmitted by reusing the PUCCH format 1.

In this case, the scheduling request (SR) of a PUCCH may be defined instead of the urgent signal (US).

That is, the following items may be defined in the RRC information element. The RRC information element may include US resource allocation information, US configuration information, and US signaling information.

If only an US is to be transmitted, an urgent signal (US) is transmitted using the PUCCH format 1

US Resource Allocation Information

If US resources for each of events defined in a cell are configured as a unicast message, the resources of the US may be set up or released through an RRC Connection Reconfig. (Radio Resource Config. Dedicated (Physical config. Dedicated (US config))) message.

Alternatively, if the resources of an US for each of events defined in a cell is configured as a broadcast message, the resources of the US may be set up or released through a System Information Block Type2 (Radio Resource Config Common (US config.)).

Furthermore, if an US is to be transmitted using the LTE(-A) physical layer structure, US resources for a maximum of 2,048 events ((0, . . . , 2047)) may be allocated to a single SF.

Alternatively, if an US is to be transmitted using a short TTI having a smaller length than the TTI (14 symbols) of an LTE(-A) system, the number of events that may be allocated to a single (i.e., short) SF may be smaller than 2,048 depending on allocated resources.

US Configuration Information

US periodicity may be set depending on an US configuration index, and an US SF offset may also be set depending on an index.

US Signaling

An urgent UE may send an US to an eNB using the simple ON/OFF keying (O.O.K) method.

D(0)=1: Preempt a PUSCH resource of (N+X)th subframe (i.e., a positive US)

D(0) means data, D(0)=1 (i.e., a positive value) means that there is the transmission of specific data, and D(0)=0 (i.e., a negative value) means that there is no transmission of specific data.

That is, D(0)=1 means that there is an US to be transmitted and indicates that the PUSCH resources of an (N+X)th SF (SF #N+X) are previously allocated so that an urgent message can be transmitted.

In this case, N indicates the number of SFs in which the US is transmitted.

Transmitting nothing indicates that there is no transmission of an urgent signal (a negative US).

The transmitting nothing may be represented as D(0)=0.

The following illustrates an example of an UrgentSignalConfig information element.

UrgentSignalConfig information element

```
-- ASN1START
UrgentSignalConfig ::=    CHOICE {
    release               NULL,
    setup                 SEQUENCE {
        us-PUCCH-ResourceIndex    INTEGER (0..2047),
        us-ConfigIndex            INTEGER (0..157),
    }
}
-- ASN1STOP
```

When an urgent event is generated, an urgent UE may carry power on resources allocated for the transmission of an urgent signal and send the urgent signal to an eNB, thus notifying the eNB that an emergency situation has occurred.

Accordingly, the eNB recognizes that the urgent event has occurred in the urgent UE and allocates a specific SF (i.e., a no-transmission SF) as resources that enable the urgent UE to send an urgent message.

A method of sending an urgent signal through a new physical channel (e.g., a physical urgent channel (PUCH)) based on resources for sending an US configured in each UE is described below.

In this case, the urgent signal may also be represented as an urgent sequence.

That is, a method of newly defining a physical urgent channel (PUCH) that belongs to PUSCH resources and that is used to send an urgent sequence so that an urgent UE in which an emergency situation has occurred rapidly sends a sequence allocated thereto is described below.

When an urgent UE enters a cell, an eNB allocates a specific sequence for sending an urgent signal to the urgent UE. The eNB can rapidly check that an emergency situation has occurred in which UE by receiving the specific sequence.

That is, the eNB may previously allocate a sequence to each UE that may be defined an urgent UE and thus directly recognize the urgent UE by receiving the allocated sequence.

The physical urgent channel (PUCH) may be defined using a method similar to that of the physical random access channel (PRACH).

First, the PRACH occupies 6 resource blocks (RBs) in the resource structure of an LTE(-A) system and has a subcarrier interval of 1.25 kHz (the format #4 has a subcarrier interval of 7.5 kHz).

Furthermore, the PRACH may have 64 preamble sequences in each cell.

Each preamble sequence part includes a ZC sequence of a length 839 (the format #4 has a length of 139).

More specifically, an urgent sequence may be defined to have a smaller number of sequences than the number of preamble sequences (64) defined in the PRACH, and each urgent sequence may be mapped to each urgent UE.

Alternatively, a specific range (0~63) of a PRACH preamble may be previously allocated as an urgent sequence for sending an urgent signal.

Reception of Urgent Signal by eNB and Transmission of Response Thereto

An operation of receiving and processing, by an eNB, an urgent signal, that is, the second step (i.e., step S1820 of FIG. 18) of the 3-step method, is described in detail below.

When an eNB receives an urgent signal from an urgent UE, it may operate according to the following three types.

Postpone or cancel an UL grant message scheduled to be transmitted to a general UE Broadcast an acknowledgment signal for an urgent signal Send an urgent acknowledgment signal First, the method of ① is described below with reference to FIG. 19.

In this case, FIG. 19 is a diagram illustrating an example of an operation method of an eNB for supporting the transmission of an urgent message, which is proposed in this specification.

FIG. 19 illustrates a method of implicitly allocating, by an eNB, resources for sending an urgent message to an urgent UE by canceling or discarding the UL grant of a general UE when the eNB receives an urgent signal from the urgent UE.

When an eNB receives an urgent signal from an urgent UE at step S1910, the eNB discards or cancels an UL grant (or message) generated for general UEs in order to preferentially allocate an UL grant for UL data transmission to the urgent UE at step S1920.

As illustrated in FIG. 19, when the eNB receives the urgent signal through an Nth SF (i.e., SF #N) from the urgent UE, the eNB releases all the UL grants that will be allocated to general UEs for the transmission of UL data in an (N+Pt)th SF.

Next, the eNB postpones resources for the UL grants for the general UEs so that the resources are allocated to an (N+Pt+1)th SF or subsequent SFs.

In this case, if the eNB immediately cancels the UL grants for the general UEs in the SF #N in which the urgent signal has been received, the transmission of the UL data of the general UEs are postponed to the (N+Pt+1)th SF. The UL grants for the general UEs are allocated or transmitted in an (N+1)th SF.

Furthermore, if the eNB may cancel the UL grants for the general UEs in the SF #N+1 right after the SF #N in which the urgent signal has been received, the transmission of the UL data of the general UEs may be postponed to an (N+Pt+2)th SF. The UL grants for the general UEs are allocated or transmitted in an (N+2)th SF.

In this case, if the eNB cancels the UL grants for the general UEs in an SF right after the SF in which the urgent signal has been received, the urgent UE may send an urgent message to the eNB after the UL grant decoding time and data encoding time (i.e., processing time) of the general UEs before the UL grants for the general UEs are canceled.

In this case, if the time taken for the eNB to receive the urgent signal from the urgent UE and to recognize the urgent signal is within 1 ms (e.g., in the case of Wi-Fi, the time required to detect a signal or sequence is within 4 us), the eNB may cancel or postpone the UL grants scheduled to be transmitted to the general UEs in the SF #N+1 right after the SF #N in which the urgent signal was received, as illustrated in FIG. 19.

If the eNB receives the urgent signal from the urgent UE in the SF #N, the eNB may cancel or postpone the UL grants of the general UEs allocated after the SF #N in which the urgent signal was received by taking into consideration the processing time Pt of the general UEs.

In this case, the processing time Pt is the sum of the decoding time and data (UL data) encoding time of the UL grants of the general UEs.

In the case of an LTE(-A) system, the processing time Pt is 4 ms (4 SFs).

However, if the processing time is shortened due to the development of an implementation technology of a UE, the eNB may directly cancel or postpone the UL grants of the general UEs even in the SF #N in which the urgent signal was received.

Furthermore, the eNB may determine the number of UL grant SFs (i.e., the number of SFs in which the UL grants are transmitted) of the general UEs by taking into consideration the size of UL grants to be allocated to the urgent signal.

However, the number of canceled or postponed UL grant SFs of the general UEs may be 1 by taking into consideration that the size of the urgent signal transmitted by the urgent UE is not great.

Referring to FIG. 19, the eNB receives the urgent signal from the urgent UE in an SF #4.

Thereafter, the eNB cancels the UL grants of the general UEs allocated to an SF #5 by taking into consideration the processing time of a system.

After sending the urgent signal to the eNB, the urgent UE sends an urgent message, including detailed information related to an emergency situation, to the eNB in an SF #9 after X SFs (X=6) at step S1930.

In this case, since the UL grants in the SF #5 have been canceled, the general UEs do not send UL data to the eNB in the SF #9 and thereafter send the UL data to the eNB in an SF #10 using an UL grant, received through an SF #6.

Additionally, the eNB may also send UL grant cancel information for notifying the general UEs that the UL grants scheduled to be transmitted to the general UEs have been canceled to the general UEs. This is described in more detail with reference to FIG. 20.

Alternatively, the general UE may predict that the UL grant to be allocated thereto will be canceled by monitoring or overhearing the urgent signal transmitted by the urgent UE and thus may not send the UL data to the eNB at a point of time at which the urgent UE sends the urgent message.

In this case, the general UE may accurately predict that its own UL grant will be canceled in what SF by taking into consideration the processing time and that it is unable to send its UL data in what SF.

As described above, the processing time Pt is the sum of the decoding time of an UL grant and the encoding time of UL data.

The method of ② is described below with reference to FIG. 20.

FIG. 20 is a diagram illustrating another example of an operation method of an eNB for supporting the transmission of an urgent message which is proposed in this specification.

FIG. 20 illustrates a method of broadcasting, by an eNB, an acknowledgment signal for an urgent signal in order to notify all the UEs within a cell that a specific urgent event has occurred when the eNB receives an urgent signal.

That is, FIG. 20 illustrates a method of explicitly sending, by an eNB, information about the generation of an urgent event to general UEs so that the general UEs stop the transmission of their UL data at a point of time at which an urgent message is transmitted.

When an eNB receives an urgent signal from an urgent UE at step S2010, the eNB sends a notification signal for notifying all the UEs within a cell that an urgent event has been generated at step S2020.

The notification signal may be represented as the acknowledgment signal of the urgent signal, a response to the urgent signal, or an urgent ACK (signal).

In this case, the eNB cancels or postpones the transmission of UL grants scheduled to be transmitted to the general UEs at a point of time (e.g., an SF #5) at which the notification signal is transmitted.

Furthermore, after receiving the notification signal from the eNB, the general UEs may neglect all the UL resources allocated by the eNB through the UL grant.

That is, the general UE that has received the urgent ACK signal from the eNB can decode an UL grant and receive the ACK signal prior to the time when a new message (UL data) is decoded. Accordingly, the general UE does not send UL data after receiving the urgent ACK signal so that the urgent UE may use UL resources allocated to the general UE.

Accordingly, a "no-transmission SF" that instructs the general UE to not send UL data although the eNB has allocated the UL grant to the general UE may be defined as an SF after the time when the general UEs have received the urgent ACK signal broadcasted by the eNB.

In this case, the general UE may not neglect all the UL resources after receiving the urgent ACK signal from the eNB.

That is, some time (e.g., X SFs) is taken for the urgent UE to send the urgent signal to the eNB and send an urgent message based on the urgent signal to the eNB and/or surrounding UEs (S2030). Accordingly, the general UE may send UL data between the time when the urgent UE sends the urgent signal and the time when the urgent UE send the urgent message by taking such some time into consideration.

In FIG. 20, such some time is represented by X SFs. Such some time may indicate the processing time of the urgent UE that is taken to decode the urgent ACK signal and encode the urgent message.

That is, the general UE may send UL data through a previously received UL grant before a point of time at which the urgent message is transmitted due to the processing time of the urgent UE.

As illustrated in FIG. 20, the general UEs may send UL data in SFs (e.g., an SF #5 and an SF #6) prior to an SF #7 in which the urgent UE (first) sends the urgent message.

In this case, if the processing time (an urgent ACK decoding time+an urgent message encoding time) of the urgent UE is reduced, the time when the general UEs may send UL data before the transmission of the urgent message may be further reduced.

The processing time of the urgent UE may be previously shared between the general UEs and/or the eNB.

Accordingly, if the general UE receives the urgent ACK signal from the eNB, the general UE may determine whether or not to send UL data by taking into consideration the time taken for the urgent UE to send the urgent signal, the processing time of the urgent UE, and time taken for the urgent UE to send the urgent message.

Accordingly, limited UL resources can be efficiently used.

Furthermore, a point of time at which the urgent UE sends the urgent message may be related to a point of time at which the general UE cancels the transmission of UL data after it receives the urgent ACK signal of the general UE.

More specifically, if the general UE is able to cancel the transmission of UL data in an SF right after an SF in which the urgent ACK signal is received from the eNB, a point of time at which the urgent UE sends the urgent message may become faster.

FIG. 20 illustrates that the time taken for the urgent UE to send the urgent signal to the eNB and taken for the general UEs to receive the urgent ACK message from the eNB is about 3 ms.

As illustrated in FIG. 20, if the general UE is able to cancel the transmission of UL data in the subsequent SF #6 as soon as it receives the urgent ACK signal from the eNB (i.e., the SF #5), the time taken for the urgent UE to send the urgent message after sending the urgent signal (i.e., the SF #3), that is, X, may be defined 3 SFs.

If the general UE is unable to cancel the transmission of UL data in a subsequent SF after receiving the urgent ACK signal, however, the time X may be defined as 4 SFs.

Furthermore, a no-transmission SF may be defined as one or more consecutive SFs after an SF in which an urgent ACK signal is received.

The no-transmission SF refers to an SF in which a general UE is unable to send UL data because an urgent UE sends an urgent signal. The no-transmission SF may indicate an SF in which the transmission of the UL data of a general UE is prohibited or an SF in which the urgent message of an urgent UE is transmitted.

The no-transmission SF may be set from an (N+2)th SF to an (N+Pt−1)th SF by taking into consideration the processing time Pt of a system.

In this case, N may be the number of SFs in which an urgent ACK signal has been received, and the processing time Pt may indicate the sum of the decoding time of an UL grant and the encoding time of data.

For example, if a general UE receives an urgent ACK signal in a fifth SF and Pt=4 SFs, a no-transmission SF may be set from a seventh SF to an eighth SF.

Alternatively, the no-transmission SF may be set as M consecutive SFs from an (N+2)th SF.

For example, if a general UE receives an urgent ACK signal in a fifth SF and M=4 SFs, a no-transmission SF is set from a seventh SF to a tenth SF.

Alternatively, the no-transmission SF may be defined as a single SF after the general UE receives the urgent ACK signal.

In this case, the no-transmission SF may be set an (N+2)th SF by taking into consideration a point of time at which the general UE receives the urgent ACK signal.

For example, if a general UE receives an urgent ACK signal in a fifth SF, a no-transmission SF may be set as a seventh SF.

The urgent ACK signal may be transmitted from an eNB to UEs within a cell using the same method as that of the urgent signal transmitted by the urgent UE.

In this case, the urgent ACK signal may be transmitted using a broadcast method because it has to be received by all the UEs (including general UEs and the urgent UE) within the cell.

In this case, the urgent ACK signal may be transmitted through specific resources of a PDCCH.

Method of Sending Urgent Message

A method of sending, by an urgent UE, an urgent message, that is, the third step (step S1830 of FIG. 18) of the 3-step method, is described in detail below.

Such a method relates to a method of sending, by an urgent UE, an urgent message after sending an urgent signal.

That is, after the urgent UE sends the urgent signal to the eNB in an SF #N, it sends the urgent message to the eNB and/or surrounding UEs after X SFs (SF #N+X) from the SF #N.

The urgent message includes detailed information related to an urgent event generated in the urgent UE.

As described above, the value of X may be determined based on a point of time at which a general UE cancels UL data after receiving an urgent ACK signal.

Alternatively, the value of X may be determined depending on the setting of a no-transmission SF.

A point of time at which an urgent UE secures resources in order to send an urgent message is described in more detail below.

A point of time at which an urgent message is transmitted may be set in various ways depending on the methods of receiving, by an eNB, an urgent signal and sending an urgent ACK signal (FIGS. 19 and 20).

First, if the method of FIG. 19 (the method of ①) is used, general UEs do not send any UL data in a no-transmission SF.

That is, an eNB does not allocate an UL grant to the general UEs or does not send the UL grant to the general UEs so that the general UEs do not send UL data in the no-transmission SF.

Accordingly, the eNB implicitly allocates resources that enable the urgent UE to send the urgent message.

In this case, the urgent UE sends the urgent message to the eNB and/or surrounding UEs according to a predetermined data transmission method (e.g., an MCS or power) using the resources of an SF (SF #N+X) on a previously agreed time or after X SFs since a point of time (SF #N) at which the urgent signal is transmitted.

If the method of FIG. 20 is used (i.e. the method of ②), the eNB explicitly sends an urgent ACK signal to UEs within a cell so that general UEs do not send UL data in a no-transmission SF.

In this case, all the general UEs within the cell which have received the urgent ACK signal do not send UL data through SFs corresponding to their UL grants, that is, no-transmission SFs, if the SFs correspond to the no-transmission SFs.

Accordingly, the urgent UE sends the urgent message through the no-transmission SF based on the reception of the urgent ACK signal.

General Apparatus to which Embodiments of the Present Invention may be Applied

FIG. 21 is a block diagram illustrating the configuration of a wireless communication apparatus to which the methods proposed in this specification may be applied.

Referring to FIG. 21, the wireless communication system includes an eNB 2110 and a plurality of UEs 2120 placed in the region of the eNB 2110.

The eNB 2110 includes a processor 2111, memory 2112, and a radio frequency (RF) unit 2113. The processor 2111 implements the functions, processed and/or methods proposed in FIGS. 1 to 20. The layers of a radio interface protocol may be implemented by the processor 2111. The memory 2112 is connected to the processor 2111, and stores various types of information for driving the processor 2111. The RF unit 2113 is connected to the processor 2111, and sends and/or receives radio signals.

The UE 2120 includes a processor 2121, memory 2122, and an RF unit 2123. The processor 2121 implements the functions, processed and/or methods proposed in FIGS. 1 to 20. The layers of a radio interface protocol may be implemented by the processor 2121. The memory 2122 is connected to the processor 2121, and stores various types of information for driving the processor 2121. The RF unit 2123 is connected to the processor 2121, and sends and/or receives radio signals.

The memory 2112, 2122 may be placed inside or outside the processor 2111, 2121 and connected to the processor 2111, 2121 through various well-known means.

Furthermore, the eNB 2110 and/or UE 2120 may include a single antenna or multiple antennas.

In the aforementioned embodiments, the elements and characteristics of the present invention have been combined in a specific form. Each of the elements or characteristics should be considered to be optional unless otherwise described explicitly. Each of the element or characteristic may be implemented in such a way as to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be substituted with corresponding elements or characteristics of another embodiment. It is evident that in the claims, an embodiment may be constructed by combining claims not having an explicit citation relation or may be included as a new claim by amendments after filing an application.

The aforementioned embodiments of the present invention may be implemented by various means, for example, hardware, firmware, software or a combination of them. In the case of implementations by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, micro controllers, and/or micro processors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

The present invention can be materialized in a specific form without departing from the spirit and essential characteristics of the present invention. Accordingly, the detailed description should not be construed as being limited from all aspects, but should be considered to be being illustrative.

The scope of the present invention should be determined by reasonable analysis into the attached claims, and all changes within an equivalent range of the present invention fall within the scope of the present invention.

INDUSTRIAL APPLICABILITY

The schemes for sending UL data in a wireless communication system according to some embodiments of the present invention have been illustrated as being applied to the 3GPP LTE/LTE-A systems, but may be applied to various wireless communication systems in addition to the 3GPP LTE/LTE-A systems.

The invention claimed is:

1. A method of transmitting uplink (UL) data in a wireless communication system supporting low latency service, the method being performed by an enhanced Node B (eNB) and comprising:
   receiving, from a first user equipment (UE), an urgent signal for notifying an event generation related to an emergency situation;
   transmitting, to at least one of the first UE or a second UE, an urgent acknowledge (ACK) signal for notifying at least one UE located within a cell of the event generation related to the emergency situation;
   cancelling a UL grant to be transmitted to the second UE, by determining at least one of a timing at which or a duration in which the UL grant is canceled,
   wherein the UL grant includes resource allocation information for transmitting, by the second UE, UL data;
   transmitting, to the second UE, a control message including information related to the cancellation of the UL grant to be transmitted to the second UE; and
   receiving, from the first UE, an urgent message including detailed information related to the emergency situation.

2. The method of claim 1, wherein:
   the urgent signal is received through a specific resource region or a specific sequence, and
   the specific resource region or the specific sequence is previously mapped to each urgent event that is generated within the cell or each urgent UE within the cell.

3. The method of claim 2, further comprising transmitting information related to the specific resource region or the specific sequence to at least one of the first UE or the second UE using any one of broadcast, unicast, and multicast methods.

4. The method of claim 1, wherein the urgent signal is received using an ON/OFF keying method or through a physical urgent channel (PUCH).

5. The method of claim 1, wherein the timing at which the UL grant of the second UE is canceled is a subframe in which the urgent signal is received or a subframe right after the subframe in which the urgent signal is received.

6. The method of claim 1, wherein the timing at which the UL grant of the second UE is canceled is one or more consecutive subframes (SFs).

7. The method of claim 1, wherein a timing at which the urgent message is received is determined by taking into consideration at least one of the timing at which the UL grant of the second UE is canceled or a processing time of the second UE.

8. A method of transmitting uplink (UL) data in a wireless communication system supporting low latency service, the method being performed by a first user equipment (UE) and comprising:

transmitting, to an enhanced Node B (eNB), an urgent signal for notifying an event generation related to an emergency situation;

receiving, from the eNB, an urgent ACK signal for notifying at least one UE located within a cell of the event generation related to the emergency situation, wherein the urgent ACK signal includes resource allocation information for transmitting an urgent message; and transmitting, to the eNB, the urgent message including detailed information related to the emergency situation, wherein a timing at which the urgent message is sent is determined by taking into consideration at least one of a timing at which an UL grant of a second UE is canceled, a timing at which the second UE stops transmitting UL data after receiving the urgent ACK signal or a processing time of the second UE, and wherein the UL grant of the second UE includes resource allocation information that enables the second UE to transmit UL data.

9. The method of claim 8, wherein the processing time of the second UE is a sum of a decoding time of the UL grant received by the second UE from the eNB and an encoding time of the UL data.

10. The method of claim 8, wherein the urgent message is transmitted through one or more consecutive subframes (SFs).

11. The method of claim 8, wherein the urgent message is transmitted after a specific time since the urgent ACK signal is received.

12. The method of claim 8, wherein:
the urgent signal is transmitted through a specific resource region or a specific sequence, and
the specific resource region or the specific sequence is previously mapped to each urgent event that is generated within the cell or each urgent UE within the cell.

13. The method of claim 8, wherein the urgent signal is received using an ON/OFF keying method or through a physical urgent channel (PUCH).

14. A method of transmitting uplink (UL) data in a wireless communication system supporting low latency service, the method being performed by a second user equipment (UE) and comprising:

receiving, from an enhanced Node B (eNB), a control message for notifying an event generation related to an emergency situation, wherein the control message includes information related to cancellation of an UL grant scheduled to be transmitted to the second UE, wherein the information related to the cancellation of the UL grant comprises at least one of a timing at which or a duration in which the UL grant is canceled, and wherein the UL grant includes resource allocation information for transmitting, by the second UE, UL data;

determining at least one of a timing at which or a duration in which transmitting UL data is prohibited within already allocated resource of the second UE, by taking into consideration at least one of the control message or a processing time of a system;

transmitting, to the eNB, the UL data before the timing at which transmitting UL data is prohibited or in a duration other than the duration in which transmitting UL data is prohibited; and not transmitting, to the eNB, the UL data in the duration in which transmitting UL data is prohibited.

15. The method of claim 14, further comprising overhearing, from a first UE, an urgent signal for notifying the eNB of the event generation related to the emergency situation, wherein the duration in which transmitting UL data is prohibited is determined by taking into consideration at least one of the control message or the overheard urgent signal.

* * * * *